Feb. 2, 1926.
G. CASTELLAN
1,571,751
FISH GUN
Original Filed Nov. 10, 1923    2 Sheets-Sheet 1
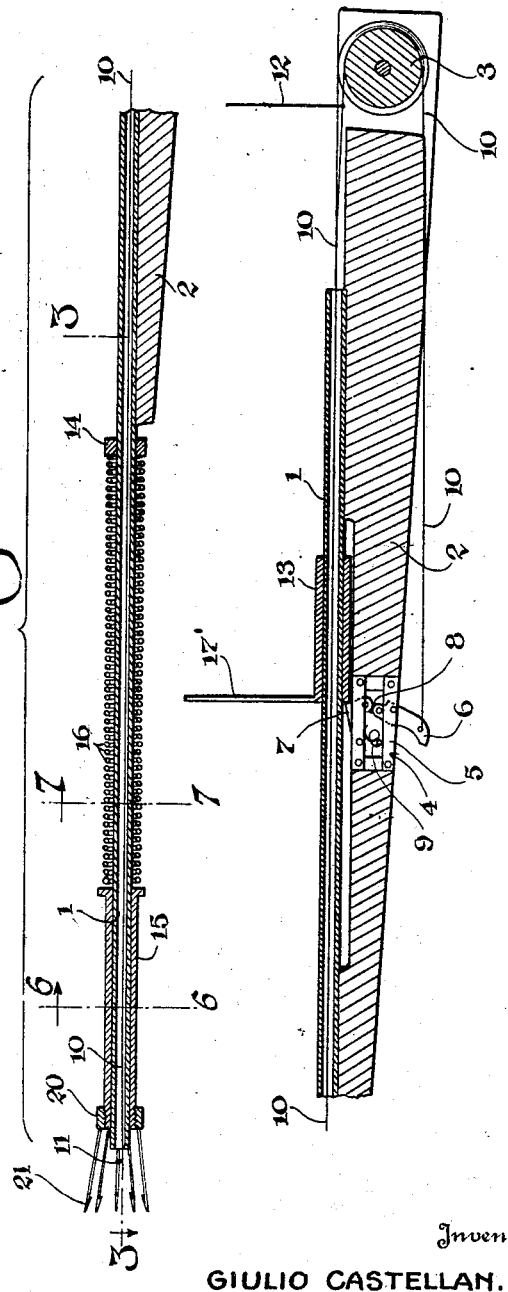
Inventor
GIULIO CASTELLAN.
By John P. Dobie
Attorney Feb. 2, 1926. 1,571,751
G. CASTELLAN
FISH GUN
Original Filed Nov. 10, 1923   2 Sheets-Sheet 2
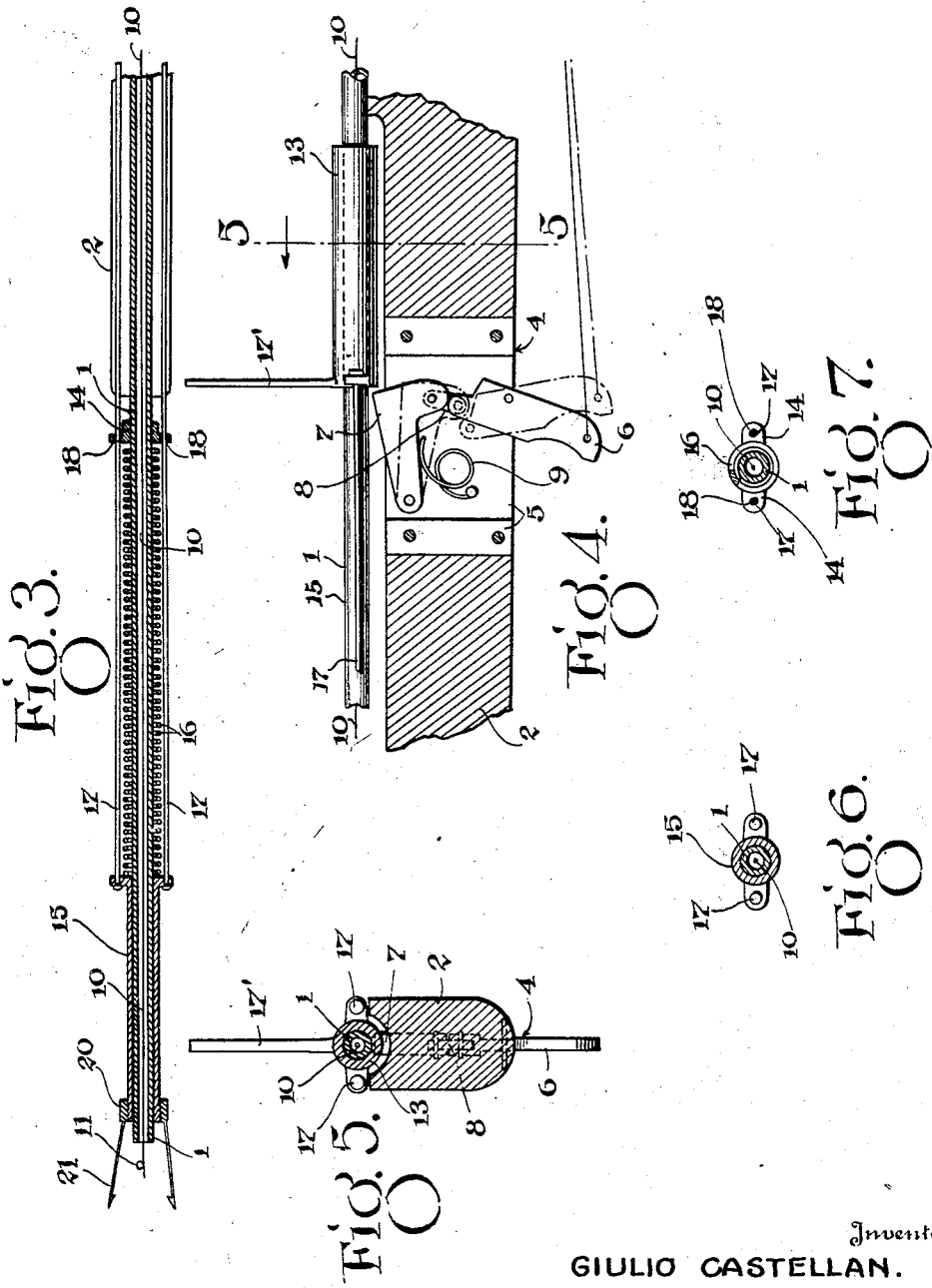
Inventor
GIULIO CASTELLAN.

Patented Feb. 2, 1926.

1,571,751

UNITED STATES PATENT OFFICE.

GIULIO CASTELLAN, OF SAN LUIS OBISPO, CALIFORNIA.

FISH GUN.

Application filed November 10, 1923, Serial No. 674,023. Renewed September 28, 1925.

*To all whom it may concern:*

Be it known that I, GIULIO CASTELLAN, a subject of the King of Italy, and residing at San Luis Obispo, in the county of San Luis Obispo and State of California, have invented certain new and useful Improvements in Fish Guns, of which the following is a specification.

This invention relates to fish guns and it consists in the novel features hereinafter described and claimed.

An object of the invention is to provide a gun mechanism having means for baiting and attracting the fish toward the gun and means for spearing the fish when it is lured into the range of the spearing means.

With this object in view the gun comprises a barrel mounted upon a stock with a trigger mechanism also mounted upon the stock. A bait line is threaded through the barrel and its intermediate portion is trained around a pulley journaled at the rear end portion of the stock. One end of the bait line is connected with the trigger and a bait hook is attached to the other end. An indicator pointer is mounted on said line and may move along the edge of the stock. A set of spaced spear hooks are slidably mounted upon the barrel and spring means are provided for quickly moving the spears beyond the muzzle of the gun barrel. Means for holding the spears in retracted position are also provided.

In the accompanying drawings—

Figure 1 is a side elevation of the fish gun.

Figure 2 is a longitudinal sectional view of the same.

Figure 3 is a horizontal section, taken on line 3—3 of Figure 2.

Figure 4 is an enlarged detail fragmentary view of the trigger mechanism and associated parts.

Figure 5 is a vertical transverse section, taken on line 5—5 of Figure 4, looking in the direction indicated by the arrows, and Figures 6 and 7 are similar views taken on lines 6—6 and 7—7 respectively, of Figure 2 looking in the direction indicated by the arrows.

As illustrated in the accompanying drawings the fish gun comprises a barrel 1 which is mounted upon a stock 2. A pulley 3 is journaled at the rear end of the stock. A trigger mechanism 4 is mounted upon the stock at a point between the ends thereof and consists of a casing 5, a trigger proper 6 pivoted in the casing, a dog 7 pivoted in the casing and operatively connected with the trigger by a link 8, and a spring 9 fixed at one end to the casing and bearing at its other end against the under edge of the dog. The spring normally holds the upper edge portion of the dog projected above the upper edge of the trigger mechanism casing. When the lower end of the trigger is pulled rearwardly the connected parts swing the dog downwardly so that its upper end portion is retracted into the casing.

A bait line 10, preferably of fine wire, is threaded through the barrel 1 and its intermediate portion is trained around the pulley 3. The rear end of the bait line is connected with the lower end portion of the trigger and a bait hook 11 is attached to the forward end of the line.

An indicator pointer 12 is mounted upon the bait line at the rear portion of the stock and the said indicator stands up and is visible above the upper ends of the stock. Therefore when the line is moved the indicator moves along the edge of the stock and the fisherman who is observing the device may know by the relative movement of the indicator that a fish is nibbling at the bait which is carried by the bait hook.

A sleeve 13 is slidably mounted upon the barrel and is engageable with the upper edge rear end of the dog when the same is elevated or projected. A cuff 14 is fixed to the barrel at a point between the ends thereof. A cuff 15 is slidably mounted upon the forward end portion of the barrel. A coil spring 16 surrounds the barrel and is interposed between the cuffs 14 and 15. The tension of the spring 16 is such as to force and hold the cuff 15 away from the cuff 14. Wires 17 connect the cuff 15 with the sleeve 13 and their intermediate portions are trained through eyes 18 carried by the fixed cuff 14.

When the sleeve 13 is moved rearwardly by using the handle 17' mounted thereon it is engaged with the dog and at the same time the wires 17 pull the cuff 15 rearwardly against the tension of the coil spring 16. Thus the cuff 15 is held at a retracted position upon the barrel. In lieu of wires chain sections may be employed at 17 if desired. A ring 20 is detachably mounted upon the cuff 15 and a series of spaced spear hooks 21 is mounted upon the ring with their pointed ends disposed beyond the forward edge of the ring. For catching different sized fish, rings having different sized spear hooks may be used. All of the spears on the ring are the same size, but rings having different sized spears may be applied to the cuff.

The fish gun when set and baited is automatic in its action in catching the fish. The fish is attracted to the bait carried by the bait hook. The fish nibbles at the bait. The fisherman observes the indicator movement along the stock and is made aware of the presence of the fish at the bait. The fish takes the bait in its mouth and pulls back to escape with it. Thus the bait line is moved to such an extent that it swings the trigger and releases the sleeve from the dog. The tension of the coil spring comes immediately into play and the cuff 15 and its attachments are moved rapidly in a forward direction whereby the spears are projected beyond the muzzle of the gun barrel and the pointed ends of the spears engage in the head of the fish while the bait is retained in the fish's mouth. Thus the fish is caught automatically by the fish gun device.

Having described the invention what is claimed is—

1. A fish gun comprising a barrel mounted upon a stock, a pulley journaled upon the stock, a trigger mechanism carried by the stock, a bait line threaded through the barrel and trained around the pulley and connected with the trigger mechanism and carrying a bait hook, a member slidably mounted on the barrel, and engageable with the trigger mechanism, a member fixed to the barrel, a member slidably mounted upon the barrel and carrying spears, a coil spring interposed between the fixed member and the last mentioned slidable member and means connecting the first and last mentioned slidable members.

2. A fish gun comprising a barrel mounted upon a stock, a pulley journaled upon the stock, a trigger mechanism carried by the stock, a bait line threaded through the barrel and trained around the pulley and connected with the trigger mechanism and carrying a bait hook, an indicator pointer mounted upon the bait line and movable along the stock, a sleeve slidably mounted on the barrel and engageable with the trigger mechanism, a cuff fixed to the barrel, a cuff slidably mounted upon the barrel, spaced spears carried by the last mentioned cuff, a coil spring interposed between the fixed and slidable cuffs and means connecting the slidable cuff with the sleeve.

3. A fish gun comprising a stock, a barrel mounted thereon, trigger mechanism upon the stock, a guide element upon the stock rearwardly of the said mechanism, a bait line extending through the barrel and about the guide element and connected at one end to the trigger of the trigger mechanism, a bait hook connected to the other end of the said line adjacent the outer end of the barrel, means slidably mounted upon the barrel including an element engaged and restrained from forward movement by the trigger mechanism, and an element connected with the first mentioned element and carrying spears, and means urging the second mentioned element in a forward direction to correspondingly project the spears upon actuation of the trigger mechanism.

4. A fish gun comprising a stock, a barrel mounted thereon, trigger mechanism upon the stock, a guide element upon the stock rearwardly of the said mechanism, a bait line extending through the barrel and about the guide element and connected at one end to the trigger of the trigger mechanism, a bait hook connected to the other end of said line adjacent the outer end of the barrel, a sleeve slidable upon the barrel and engaged and restrained from forward movement by the trigger mechanism, a sleeve slidable on the barrel, spears projecting from the forward end of the sleeve, a collar fixed upon the barrel, a spring upon the barrel engaging at one end against the said collar and at its other end against the last mentioned sleeve and tending to move the latter in a forward direction to project the spears, and guide rods extending at opposite sides of the barrel and fixed at their forward ends to the rear end of the last mentioned sleeve and extending slidably through the collar and secured at their rear ends to the first mentioned sleeve.

In testimony whereof I affix my signature.

GIULIO CASTELLAN.